March 25, 1958   C. A. KARKLING   2,827,846
PORTABLE FOOD PREPARING DEVICE
Filed Oct. 25, 1954   2 Sheets-Sheet 1
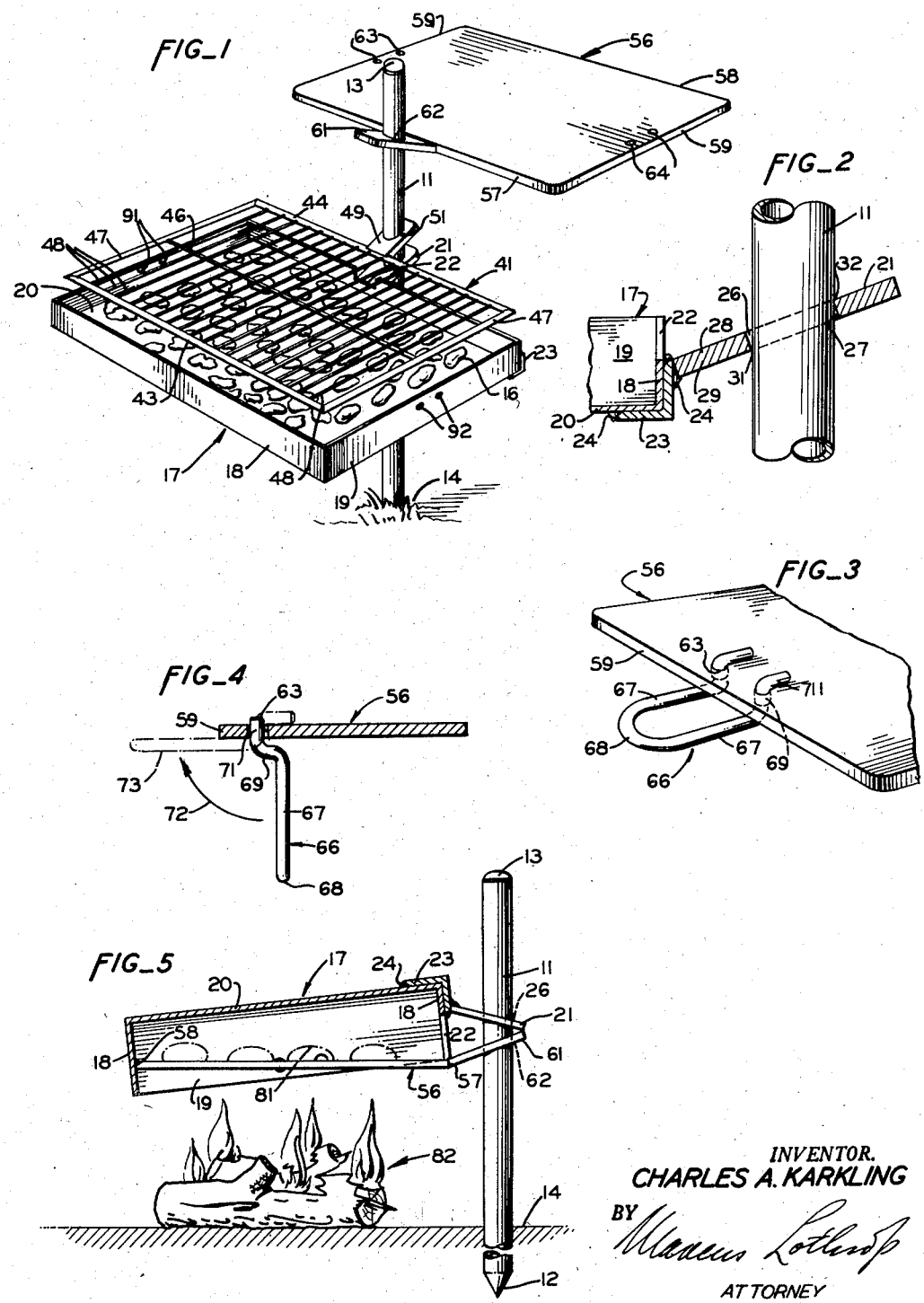
INVENTOR.
CHARLES A. KARKLING
BY
ATTORNEY March 25, 1958 C. A. KARKLING 2,827,846
PORTABLE FOOD PREPARING DEVICE
Filed Oct. 25, 1954 2 Sheets-Sheet 2
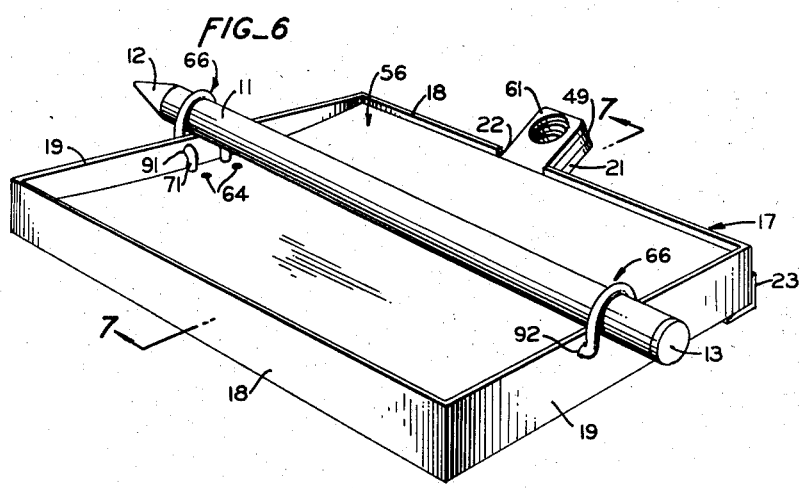
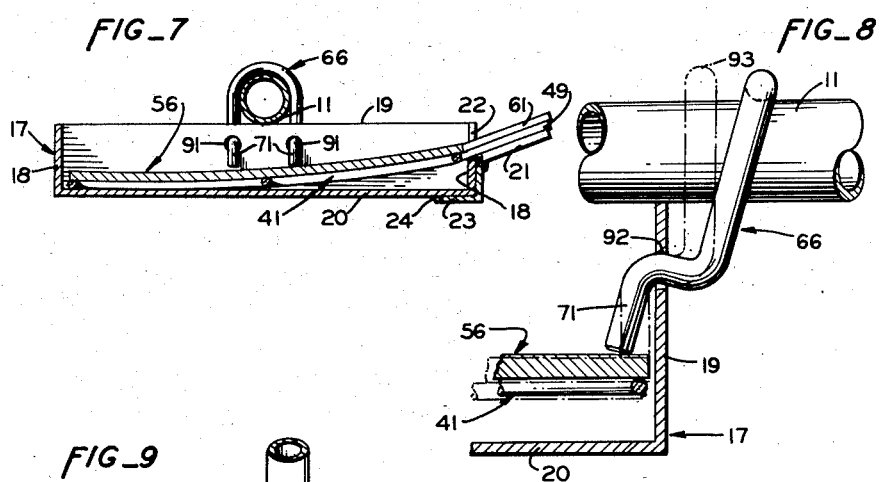
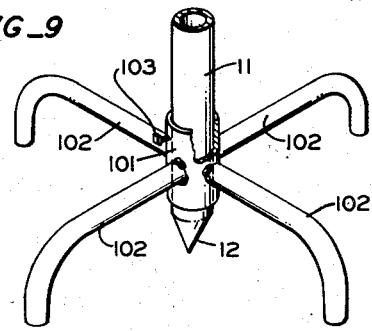
INVENTOR.
CHARLES A. KARKLING
BY
ATTORNEY

United States Patent Office 2,827,846
Patented Mar. 25, 1958

2,827,846

PORTABLE FOOD PREPARING DEVICE

Charles A. Karkling, Williams, Calif.

Application October 25, 1954, Serial No. 464,381

2 Claims. (Cl. 99—339)

The invention relates to portable equipment for barbecuing and otherwise cooking and preparing foods.

In recent years outdoor cookery has enjoyed great popularity, not only around the home but also on picnics and other recreational activities. While home barbecue pits, outdoor cooking ovens and other facilities are often desirable, it is frequently found that owing to space or cost or other limitations, the bulky, fixed type of installation is not feasible. Furthermore, when picnicking or camping, away from home, food preparation of any but the most rudimentary sort has heretofore been restricted to the crowded public areas offering fixed cooking facilities such as stone or brick pits and ovens.

It is therefore an object of the invention to provide a portable food preparing device which is inexpensive yet durable in construction.

It is further object of the invention to provide a food preparing device which offers to the user substantially all of the cooking facilities available in large and complicated cooking devices yet which is easily assembled and disassembled and which is portable.

It is yet another object of the invention to provide a portable food preparing device which folds into a compact, self-contained unit, convenient to carry and to store when not in use.

It is a still further object of the invention to provide a generally improved portable food preparing device.

Other objects, together with the foregoing, are attained in the embodiment described below and illustrated in the accompanying drawings in which:

Figure 1 is a perspective view of the device with the elements set up in a typical position ready for use.

Figure 2 is a partial sectional view of the pan and handle supported on the stake, the plane of section being along a substantially median vertical plane.

Figure 3 is a perspective view of one end of the griddle, and showing one of the U-shaped lifting handles fitted thereon, a portion of the figure being broken away to reduce the extent of the figure.

Figure 4 is a transverse sectional griddle through the near handle opening shown in Figure 3 and illustrating the manner in which the U-shaped handle is fitted on the griddle.

Figure 5 is a sectional view showing the use of the griddle and pan as an enclosed oven used, for example, to bake biscuits.

Figure 6 is a perspective view of the device in its closed, or nested and clamped, position.

Figure 7 is a section along the plane indicated by the line 7—7 of Figure 6.

Figure 8 is a sectional view, to an enlarged scale, of the U-shaped handle installed on the pan in closed position of the device and illustrating the camming and wedging action of the handle in clamping the griddle and grill in the pan to prevent rattle.

Figure 9 is a perspective view of a stake support.

The portable food preparing device of my invention is susceptible of numerous physical embodiments depending upon the particular environment in which it is to be used, but a number of devices of the type herein shown and described have been made and used, and have performed in an eminently satisfactory fashion.

In order to support the various elements in co-operative relation a stake 11 having a point 12 and a cap 13 is driven into the ground 14, preferably in vertical attitude.

One of the major advantages of using the food preparing device of my invention is that the fuels, such as briquets 16, are located in a fire box 17, or pan, having a pair of end walls 18, a pair of side walls 19 and a bottom panel 20, serving as boundaries to confine the fuel and to reflect and concentrate the heat at the desired location.

The usefulness of the pan is enhanced by the provision of a pan handle 21 centrally mounted on one of the side walls of the pan and adjacent the bottom of a rectangular slot 22, or recess, formed in the upper half of the pan side wall and extending transversely approximately the width of the pan handle, the handle being inclined upwardly. The side wall carrying the handle is stiffened by an angle iron 23 secured to the bottom and the side wall, as by weldments 24.

The outwardly and upwardly inclined pan handle 21 not only permits the user to carry the pan conveniently, but also serves to position the pan in a location above and spaced from the surface of the ground, so as to preclude the start of weed, grass and forest or other hostile fires.

Approximately centrally located on the handle is a circular opening 26 having a diameter slightly greater in extent than the diameter of the stake 11, and whose walls 27 are substantially normal to the upper and lower surfaces, 28 and 29, respectively, of the handle 21. The diameter of the opening 26 is adequate to permit the user to insert the opening over the stake and to slide the pan downwardly to a convenient position, but is of such size that as the user lets go of the pan, gravity causing the pan to rock or pivot downwardly, the lower inner portion 31, or corner, and the upper outer portion 32, or corner, of the walls 27 abut the stake in binding or jamming engagement and in this fashion support the weight of the pan and its contents. Additional weight, in fact, serves to bind the handle to the stake even more firmly. Unique results are obtained by the jamming support. The vertical position of the handle and the pan are quickly and easily changed or adjusted merely by tilting the pan upwardly, and thus disengaging the handle, moving the pan upwardly or downwardly to the position desired and then permitting the handle to re-engage the stake by releasing the pan; furthermore, the pan can be swung laterally out of the way if desired, swinging in a horizontal plane about the vertical stake as a pivot, by pushing against an end of the pan. When swung in this fashion, the stake-engaging portions 31 and 32 of the handle continuously stay in engagement with the stake and thus continue to support the pan at the predetermined fixed or desired vertical position yet allow the pan to swing out of the way without the necessity of tilting the pan upward to disengage the bindings corners 31 and 32 from the stake.

Having a glowing bed of coals, such as the briquets 16, in the pan, the cook is able to cook foods in pans or to barbecue or fry directly over the coals owing to the provision of a supporting grill 41 comprising a pair of longitudinal side members 43 and 44, and central reinforcing member 46 as well as a pair of end members 47 and a plurality of spaced transverse members 48, the size of the grill being slightly less than the inside dimensions of the pan so as to permit the grill to nest within the pan in packed or closed position of the device. The grill is provided with a handle 49 closely resembling the pan handle and inclined upwardly at a similar angle from its mounting on the middle of the grill side member 44. The grill handle 49 also has a circular opening 51 formed therein in a fashion quite like that encountered in the pan handle and which serves to position the grill at any vertical location desired by jamming or binding engagement with the stake while allowing the grill to be swung horizontally out of the way, if desired.

In comparable fashion, other food and implement supporting shelves, such as a griddle 56, may be used, the griddle having a pair of sides 57 and 58 and a pair of ends 59 and being comparable in size to the dimensions of the grill. Mounted centrally on the side 57 and extending upwardly at an angle similar to the angle assumed by the pan handle 21 and grill handle 49 is a griddle handle 61 having a central circular opening 62 for binding engagement with the stake. Adjacent each of the ends 59 of the griddle and at a transverse location such as to straddle the longitudinal center-of-gravity axis (the longitudinal center-of-gravity axis being laterally displaced from the longitudinal spatial axis toward the side 57 by an amount dependent upon the weight of the handle 61) is a pair of apertures 63 and 64. Adapted to engage with the pairs of apertures 63 and 64 is a pair of U-shaped tray handles 66, each having a pair of legs 67 extending from a U-shaped end or cross member 68. The legs are each bent normally, adjacent their lower ends, to form an upstanding portion 69, at the ends of which the legs are bent to form a toe 71 or offset portion. Numerous uses have been found for the tray-handles 66. For example, if a number of griddle cakes have been cooked on the griddle and it is desired to transport the entire griddle to the table for serving it is only necessary to insert into the griddle apertures the tray handles from below, as most clearly appears in Figure 4, and rotate the handles in the direction indicated by the arrow 72 until the handle assumes the tray supporting position shown in outline in Figure 4 and designated by the numeral 73. Since the apertures are located on the center-of-gravity axis the tray handles are similarly disposed and the griddle has no tendency to tilt when being carried. The tray handles can also be used in conjunction with the grill, the toe 71 fitting over the end transverse member 48.

Frequently it is desired to bake foods, such as biscuits 81, the griddle 56 serving admirably as a support for this purpose. The baking oven or enclosure is obtained by turning the pan 17 upside down and sliding the pan handle opening 26 downwardly, as appears in Figure 5, until the outer tip of the pan handle 21 abuts the outer tip of the griddle handle 61. In upside down position, the pan handle opening 26 is not in locking or jamming engagement with the stake and thus the pan is not self-supporting when acting as an oven. The pan derives support, however, from abutment with the griddle handle tip on one side as explained above, and from abutment between the inside pan wall and the top of the griddle side 57; and on the other or outer side of the oven the inside of the outer wall of the pan wedges or abuts against the outer side 58 of the griddle. These three points of support or contact serve very effectively to hold the pan in oven forming position when baking in this fashion. Heat is frequently supplied by a fire 82 built under the griddle, as shown in Figure 5.

While the tray handles 66 possess considerable utility in enabling the grill and griddle to be handled without resorting to gloves, pot-holders or other insulating accessories, probably their greatest value resides in their ability to nest and hold the components of the device in tight relation. At conclusion of cooking and after cleaning of the parts the pan, griddle and grill are slid upwardly and off the stake. The grill and griddle are then nested, in that order, in the pan, in the manner shown in Figures 6 and 7, the handles of the various members assuming an overlying relation and the grill and griddle sloping downwardly from the handles to the bottom of the pan on the opposite side as clearly appears in Figure 7. At this juncture the tray-handles 66 are inserted through corresponding pairs of apertures 91 and 92 at each end of the pan, it being noted that the tray handles may be used to transport the pan when hot or coal-laden in this manner. Having inserted the handles through the pairs of apertures 91 and 92, the tray handles are tilted inwardly until they assume the vertical attitude shown in outline in Figure 8 and designated by the numeral 93, the ends of at least one of the toes bearing downwardly against the griddle and camming or bending the griddle and underlying grill downwardly, causing them to assume the downwardly bowed shape appearing in Figures 6 and 7.

When the tray handles are in vertical or uppermost position, the stake 11 can readily be inserted underneath the U-shaped portion of the handles. Once the stake is placed in position the tray handles can be let go of, and owing to the upward force exerted by the bowed griddle and grill acting through a moment arm measured by the horizontal histance between the aperture 92 and the vertical axis of the toe 71, as appears in Figure 8, the handle is caused to rock or tilt, about the upper wall of the aperture 92 as a pivot, until the handle 66 assumes the position shown in full line in Figure 8, with the upper or U-shaped portion of the handle bearing tightly downwardly against the stake to prevent its rattling and serving to lock the stake tightly in position and prevent its endwise translation. Concurrently, even though the original deep bow of the griddle has somewhat lessened, the toe 71 is made sufficiently long so that considerable bowing of the griddle and grill still exists, and in this fashion the griddle and grill are retained or held or nested forcefully and tightly in the pan. Not only is rattling of the metal parts thereby eliminated but the stake is so tightly held that the entire packed unit may conveniently be lifted and transported, utilizing the stake as a handle.

Frequently it will be found preferable not to drive the stake into the ground. In this event an above-ground support of the kind illustrated in Figure 9 is found to be of considerable value. A vertical sleeve 101 having welded thereon a plurality of outwardly projecting and down-turned supporting arms 102 is placed on the ground or other supporting surface. The stake 11 is thereupon inserted in the sleeve, the stake point being allowed to touch the ground, or being held upwardly spaced therefrom by a suitable element such as a clamping nut 103.

What is claimed is:

1. A portable food preparing device comprising a supporting stake, a grill, a griddle plate, and a pan, said grill, said griddle plate and said pan each having an inclined and apertured handle vertically adjustable and laterally swingable on said stake, a pair of handles each having a U-shaped leg portion, an offset portion and a toe portion adapted to be inserted through corresponding apertures in the opposite end walls of said pan, each of said toe portions having a sufficient length resiliently to depress said griddle plate in nested position of said griddle plate in said pan, said U-shaped portions of said handles each having a diameter adapted to receive said stake in snug relation, said handles being pivotally movable about said offset portions in said apertures to move in cross lever relation under urgency of said griddle plate whereby said stake is urged against said pan.

2. A portable barbecue device comprising an elongated pan having a pair of end walls each including a pair of horizontally disposed and spaced apertures, an elongated griddle plate nestable in said pan in inclined relation to said end walls, a pair of handles each having a pair of toe portions insertable through said pair of apertures in said end wall and swingable into downwardly deflecting relation with the adjacent portion of said inclined griddle plate, each of said handles also including a pair of offset portions insertable into said apertures for pivoting cooperation with the upper walls of said apertures, and a pair of upstanding leg portions substantially parallel with said toe portions, said leg portions merging into a U-shaped portion, and a stake insertable longitudinally through said U-shaped portions of said pair of handles and urged thereby against the adjacent portions of said end walls of said pan.

References Cited in the file of this patent

UNITED STATES PATENTS

| | | |
|---|---|---|
| 144,151 | Smith | Oct. 28, 1873 |
| 585,284 | Paden | June 9, 1897 |
| 1,246,622 | Lightfoot | Nov. 13, 1917 |
| 1,612,468 | Reichold | Dec. 28, 1926 |
| 1,666,293 | Lorton | Apr. 17, 1928 |
| 1,698,914 | Kircher | Jan. 15, 1929 |
| 2,168,604 | Lee | Aug. 8, 1939 |
| 2,173,024 | Park | Sept. 12, 1939 |
| 2,221,098 | Langsam | Nov. 12, 1940 |
| 2,247,669 | Sainich | July 1, 1941 |
| 2,637,313 | White | May 5, 1953 |